(12) United States Patent
Horiuchi et al.

(10) Patent No.: US 9,774,234 B2
(45) Date of Patent: *Sep. 26, 2017

(54) PERMANENT MAGNET AND METHOD FOR MANUFACTURING THE SAME, AND MOTOR AND POWER GENERATOR USING THE SAME

(75) Inventors: Yosuke Horiuchi, Chigasaki (JP); Shinya Sakurada, Tokyo (JP); Keiko Okamoto, Kawasaki (JP); Masaya Hagiwara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 13/616,833

(22) Filed: Sep. 14, 2012

(65) Prior Publication Data

US 2013/0241333 A1   Sep. 19, 2013

Related U.S. Application Data

(63) Continuation of application No. PCT/JP2010/002317, filed on Mar. 30, 2010.

(51) Int. Cl.
*H01F 7/02* (2006.01)
*B22F 3/24* (2006.01)
(Continued)

(52) U.S. Cl.
CPC .............. *H02K 21/00* (2013.01); *C22C 1/02* (2013.01); *C22C 19/07* (2013.01); *C22C 33/02* (2013.01);
(Continued)

(58) Field of Classification Search
CPC ......... B22F 3/10; H01F 1/0577; H01F 1/0596
(Continued)

(56) References Cited

U.S. PATENT DOCUMENTS

| 7,713,360 B2 | 5/2010 | Ohashi |
| 8,179,068 B2 | 5/2012 | Yuuki et al. |

(Continued)

FOREIGN PATENT DOCUMENTS

| CN | 101490946 A | 7/2009 |
| EP | 1 569 247 A1 | 8/2005 |

(Continued)

OTHER PUBLICATIONS

Xiong et al. Acta Materialia, 2004, vol. 52, p. 737-748.*

(Continued)

*Primary Examiner* — Jie Yang
*Assistant Examiner* — Xiaowei Su
(74) *Attorney, Agent, or Firm* — Oblon, McClelland, Maier & Neustadt, L.L.P.

(57) ABSTRACT

In an embodiment, a permanent magnet includes a composition represented by a composition formula: $R(Fe_pM_qCu_r(Co_{1-s}A_s)_{1-p-q-r})_z$, where, R is at least one element selected from rare earth elements, M is at least one element selected from Ti, Zr, and Hf, A is at least one element selected from Ni, V, Cr, Mn, Al, Si, Ga, Nb, Ta, and W, $0.05 \le p \le 0.6$, $0.005 \le q \le 0.1$, $0.01 \le r \le 0.15$, $0 \le s \le 0.2$, and $4 \le z \le 9$, and a two-phase structure of a $Th_2Zn_{17}$ crystal phase and a copper-rich phase. In a cross-section of the permanent magnet containing a crystal c axis of the $Th_2Zn_{17}$ crystal phase, an average distance between the copper-rich phases is 120 nm or less.

16 Claims, 5 Drawing Sheets

(51) Int. Cl.
*H01F 41/02* (2006.01)
*H02K 21/00* (2006.01)
*C22C 19/07* (2006.01)
*C22C 33/02* (2006.01)
*H01F 1/055* (2006.01)
*C22C 1/02* (2006.01)

(52) U.S. Cl.
CPC ....... *H01F 1/0557* (2013.01); *H01F 41/0266* (2013.01); *C22C 2202/02* (2013.01)

(58) Field of Classification Search
USPC .......................................... 148/101–103, 301
See application file for complete search history.

(56) References Cited

U.S. PATENT DOCUMENTS

| 2002/0054825 | A1* | 5/2002 | Sukaki et al. .................. 420/83 |
| 2005/0189042 | A1 | 9/2005 | Ohashi |
| 2011/0278976 | A1* | 11/2011 | Horiuchi et al. ............. 310/152 |
| 2012/0074804 | A1* | 3/2012 | Horiuchi et al. ............. 310/152 |
| 2012/0146444 | A1* | 6/2012 | Horiuchi et al. ............. 310/152 |
| 2012/0181970 | A1 | 7/2012 | Yuuki et al. |

FOREIGN PATENT DOCUMENTS

| JP | 03054805 A | * | 3/1991 |
| JP | 9-111383 | | 4/1997 |
| JP | 2002-246215 A | | 8/2002 |
| JP | 2003-193208 A | | 7/2003 |
| JP | 2005-243883 A | | 9/2005 |
| JP | 2005-243884 A | | 9/2005 |
| JP | 2008-029148 A | | 2/2008 |
| JP | 2008-43172 A | | 2/2008 |
| JP | 4764526 | * | 12/2009 |
| JP | 2010-034522 A | | 2/2010 |
| WO | WO 2009/145229 A1 | | 12/2009 |

OTHER PUBLICATIONS

Liu et al. IEEE Transations on Magnetics, 1989, vol. 25, p. 3785-3787.*
JP03-054805A, Mar. 1991.*
International Preliminary Report on Patentability issued Nov. 1, 2012, in International application No. PCT/JP2010/002317 (English translation only).
International Search Report mailed on Aug. 13, 2010, issued for International Application No. PCT/JP2010/002317, filed on Mar. 30, 2010 (with English translation of Categories).
International Written Opinion mailed on Aug. 13, 2010, issued for International Application No. PCT/JP2010/002317, filed on Mar. 30, 2010.
Chinese Office Action issued Dec. 30, 2014, in China Patent Application No. 201080065793.5 (with English translation).

* cited by examiner

PERMANENT MAGNET AND METHOD FOR MANUFACTURING THE SAME, AND MOTOR AND POWER GENERATOR USING THE SAME

CROSS-REFERENCE TO RELATED APPLICATION

This application is a continuation of prior International Application No. PCT/JP2010/002317, filed on Mar. 30, 2010; the entire contents of all of which are incorporated herein by reference.

FIELD

Embodiments described herein relate generally to a permanent magnet and a method for manufacturing the same, and a variable magnetic flux motor and a variable magnetic flux generator using the same.

BACKGROUND

In a variable magnetic flux motor and a variable magnetic flux generator, two types of magnets, a variable magnet and a stationary magnet, are used. Conventionally, in the variable magnet, an Al—Ni—Co based magnet or a Fe—Cr—Co based magnet is used. In order to increase performance and efficiency of the variable magnetic flux motor and the variable magnetic flux generator, improvement in coercive force and magnetic flux density of the variable magnet is demanded. As high-performance permanent magnets, Sm—Co based magnets are known. Among the Sm—Co based magnets, an $Sm_2Co_{17}$ type magnet has a two-phase separation structure of a 2-17 crystal phase and a 1-5 type crystal phase, and obtains magnetic characteristics by a coercive force exhibition mechanism of magnetic domain wall pinning type.

The $Sm_2Co_{17}$ type magnet has excellent coercive force and largest magnetic energy product, but is costly because it contains a large amount of cobalt, and has small magnetic flux density compared to a magnet which is constituted mainly of iron. To improve magnetic flux density of the $Sm_2Co_{17}$ type magnet, it is effective to increase an iron concentration, and the $Sm_2Co_{17}$ type magnet can be reduced in cost by increasing the iron concentration. However, the $Sm_2Co_{17}$ type magnet with a high iron concentration has a tendency of steep rising of initial magnetization curve. For the variable magnet, in order to have a large variable width, a magnet having a small gradient of rising of initial magnetization curve is demanded. Accordingly, in the $Sm_2Co_{17}$ type magnet with a high iron concentration composition, suppression of the rising of initial magnetization curve is demanded.

DETAILED DESCRIPTION

Figure 1:
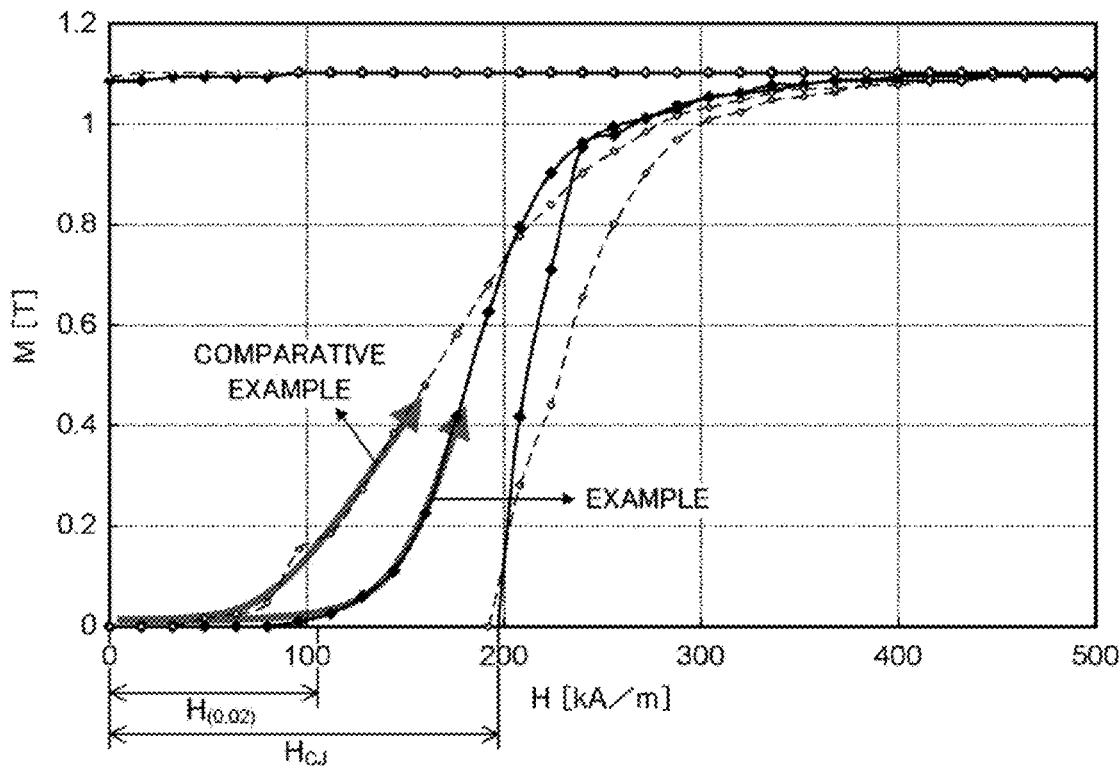
FIG. 1 is a graph illustrating an example of a magnetization curve of a permanent magnet according to an embodiment.

According to an embodiment, there is provided a permanent magnet including a composition represented by a composition formula:

$$R(Fe_pM_qCu_r(Co_{1-s}A_s)_{1-p-q-r})_z \quad (1)$$

where, R is at least one element selected from rare earth elements, M is at least one element selected from Ti, Zr, and Hf, A is at least one element selected from Ni, V, Cr, Mn, Al, Si, Ga, Nb, Ta, p is a number satisfying $0.05 \le p \le 0.6$ (atomic ratio), q is a number satisfying $0.005 \le q \le 0.1$ (atomic ratio), r is a number satisfying $0.01 \le r \le 0.15$ (atomic ratio), s is a number satisfying $0 \le s \le 0.2$ (atomic ratio), and z is a number satisfying $4 \le z \le 9$ (atomic ratio), and a structure including a $Th_2Zn_{17}$ crystal phase (2-17 type crystal phase) and a copper-rich phase ($CaCu_5$ crystal phase (1-5 type crystal phase) and the like) having a copper concentration in a range from 1.2 times to 5 times a copper concentration in the $Th_2Zn_{17}$ crystal phase. In the permanent magnet according to the embodiment, an average distance between the copper-rich phases in a cross section including a crystal c axis of the $Th_2Zn_{17}$ crystal phases is 120 nm or less.

In the above-described composition formula (I), at least one element selected from rare earth elements containing yttrium (Y) is used as the element R. The element R provides a large magnetic anisotropy in magnetic materials, and gives high coercive force. As the element R, it is more preferred to use at least one element selected from samarium (Sm), cerium (Ce), neodymium (Nd), and praseodymium (Pr), and it is particularly desired to use Sm. By making 50 atomic % or more of the element R be Sm, performance of the permanent magnet, particularly the coercive force can be increased with good reproducibility. Further, it is desired that 70 atomic % or more of the element R is Sm.

The element R is blended so that the atomic ratio between the element R and the other elements (Fe, M, Cu, Co, A) is in the range of 1:4 to 1:9 (the range of 4 to 9 as the value z/the range of 10 to 20 atomic % as the content of element R). When the content of element R is less than 10 atomic %, a large amount of α-Fe phase precipitates, and sufficient coercive force cannot be obtained. When the content of element R is more than 20 atomic %, reduction in saturation magnetization becomes significant. More preferably, the content of element R is in the range of 10 atomic % to 15 atomic %, more preferably in the range of 10.5 atomic % to 12.5 atomic %.

As the element M, at least one element selected from titanium (Ti), zirconium (Zr), and hafnium (Hf) is used. By blending the element M, large coercive force can be exhibited by the composition with a high iron concentration. The content of element M is in the range of 0.5 atomic % to 10 atomic % ($0.005 \leq q \leq 0.1$) in the total amount of the elements (Fe, Co, Cu, M) other than the element R. When the value q is more than 0.1, decrease in magnetization is significant. When the value q is less than 0.005, the effect of increasing the iron concentration is small. More preferably, the content of element M is $0.01 \leq q \leq 0.06$, further more preferably $0.015 \leq q \leq 0.04$.

The element M may be any one of Ti, Zr, and Hf, but is preferred to contain at least Zr. In particular, by making 50 atomic % or more of the element M be Zr, the effect of increasing the coercive force of the permanent magnet can be increased further. On the other hand, Hf is particularly expensive. When Hf is used, it is preferred that the amount used be small. Preferably, the content of Hf is less than 20 atomic % of the element M.

The copper (Cu) is an essential element for allowing the permanent magnet to exhibit high coercive force. The content of Cu is in the range of 1 atomic % to 15 atomic % ($0.01 \leq r \leq 0.15$) in the total amount of the elements (Fe, Co, Cu, M) other than the element R. When the value r is more than 0.15, decrease in magnetization is significant. When the value r is less than 0.01, it is difficult to obtain high coercive force. More preferably, the content of Cu is $0.02 \leq r \leq 0.1$, further more preferably $0.03 \leq r \leq 0.08$.

The iron (Fe) mainly assumes the role of magnetization in the permanent magnet. By blending a large amount of Fe, saturation magnetization of the permanent magnet can be increased. However, when the content of Fe is too excessive, the α-Fe phase precipitates, and it becomes difficult to obtain the two-phase structure of the 2-17 type crystal phase and the copper-rich phase (1-5 type crystal phase and the like). Accordingly, the coercive force of the permanent magnet decreases. The content of Fe is in the range of 5 atomic % to 60 atomic % ($0.05 \leq p \leq 0.6$) in the total amount of the elements (Fe, Co, Cu, M) other than the element R. More preferably, the content of Fe is $0.26 \leq p \leq 0.5$, further more preferably $0.28 \leq p \leq 0.48$.

The cobalt (Co) assumes the role of magnetization of the permanent magnet, and is an important element for exhibiting high coercive force. When a large amount of Co is contained, the Curie temperature increases, and heat stability of the permanent magnet improves. When the content of Co is small, these effects are small. When Co is contained excessively in the permanent magnet, the content of Fe decreases relatively, and it may cause decrease in magnetization. The content of Co is in the range defined by p, q, and r (1-p-q-r).

Part of Co may be replaced with at least one element A selected from nickel (Ni), vanadium (V), chrome (Cr), manganese (Mn), aluminum (Al), silicon (Si), gallium (Ga), niobium (Nb), tantalum (Ta), and tungsten (W). These replacing elements contribute to improvement in magnetic characteristics, for example coercive force. However, excessive replacement of Co with the element A may lead to decrease in magnetization. The amount of replacement with the element A is in the range of less than or equal to 20 atomic % of Co ($0 \leq s \leq 0.2$).

Regarding a $Sm_2Co_{17}$ type magnet, a $TbCu_7$ crystal phase (1-7 type crystal phase), which is a high temperature phase, as a precursor is subjected to aging treatment, and is separated into $Th_2Zn_{17}$ crystal phase (2-17 type crystal phase) and $CaCu_5$ crystal phase (1-5 type crystal phase), thereby obtaining magnetic characteristics based on a coercive force exhibition mechanism of magnetic domain wall pinning type. The 2-17 type crystal phase becomes a main phase (intragranular phase), and 1-5 type crystal phase (grain boundary phase) precipitates in a grain boundary to section the 2-17 type crystal phase, thereby making a secondary structure called a cell structure. By spinodal decomposition, the 1-5 type crystal phase becomes Cu rich and Fe poor, and the 2-17 type crystal phase becomes Cu poor and Fe rich.

The origin of the coercive force in the $Sm_2Co_{17}$ type magnet is in a minute structure formed by phase decomposition. Magnetic domain wall energy of the 1-5 type crystal phase precipitated in the grain boundary is large compared to magnetic domain wall energy of the 2-17 type crystal phase which is the main phase, and this difference in magnetic domain wall energy becomes a barrier for magnetic domain wall movement. That is, the 1-5 type crystal phase with large magnetic domain wall energy operates as a pinning site. It is conceivable that the difference in magnetic domain wall energy is formed mainly by a concentration difference of copper (Cu). When the Cu concentration in the phase precipitating in the grain boundary is sufficiently higher than the Cu concentration in the grain, the coercive force is exhibited. Accordingly, it is important that the pinning site is a Cu rich phase.

A representative example of Cu rich phase is the above-described $CaCu_5$ crystal phase (1-5 type crystal phase), but it is not necessarily limited thereto. The Cu rich phase may have a Cu concentration which is more than or equal to 1.2 times and less than or equal to 5 times the Cu concentration in the 2-17 type crystal phase which is the main phase. When the Cu concentration in the Cu rich phase is more than or equal to 1.2 times the Cu concentration in the 2-17 type crystal phase, the Cu rich phase can function as the pinning site. However, when the Cu concentration in the Cu rich phase is larger than 5 times the Cu concentration in the 2-17 type crystal phase, the coercive force becomes enormous and it is not suitable for a variable magnet. The Cu rich phase besides the 1-5 type crystal phase includes 1-7 type crystal phase which is the high-temperature phase, and a precursor of 1-5 type crystal phase formed in an initial stage of the two-phase separation of the 1-7 type crystal phase.

Thus, the magnetic characteristics of the $Sm_2Co_{17}$ type magnet are affected by the Cu rich phase. For example, it is conceivable that precipitation intervals of the Cu rich phases largely affect a magnetic domain wall pinning behavior. When the Cu rich phases precipitate coarsely and largely, and the intervals between the Cu rich phases are large, the distance for a magnetic domain wall which overcame the energy barrier of one pinning site (Cu rich phase) to be pinned to the next pinning site becomes long, and hence the amount of inverse spin becomes large. As a result, the way of rising of initial magnetization curve becomes steep. That is, if it is possible to control a structure so that the precipitation intervals of the Cu rich phases become small, it is possible to suppress the rising of initial magnetization curve of the $Sm_2Co_{17}$ type magnet with a high Fe concentration.

The structure of the $Sm_2Co_{17}$ type magnet depends strongly on manufacturing processes. For example, in an aging treatment, heat treatment is performed at temperatures between 750° C. and 900° C., controlled cooling is performed thereafter, and quenching is started at a time when it is cooled to a certain temperature. When the aging treatment temperature is too low, precipitation of the Cu rich phases is insufficient, and an energy difference of the degree to hinder movement of magnetic domain wall does not occur between the intragranular phase and the Cu rich phase. As a result, the coercive force exhibition mechanism by the difference in magnetic domain wall energy does not function. On the other hand, when the aging treatment temperature is too high, the Cu rich phases become coarse and the precipitation intervals between the Cu rich phases become large. As a result, the way of rising of initial magnetization curve becomes steep.

The permanent magnet of this embodiment has a two-phase separation structure of the intragranular phase (main phase) which is formed from the 2-17 type crystal phase and the Cu rich phase (1-5 type crystal phase or the like) which precipitated in the granular boundary, in which the Fe concentration is increased to improve magnetic flux density and to reduce costs. In this permanent magnet, aging treatment conditions and so on corresponding to an alloy composition are applied to control the metallic structure, to thereby make the average distance d between the Cu rich phases (grain boundary phases) in a cross section including a crystal c axis of the 2-17 type crystal phase to be less than or equal to 120 nm. Thus, the rising of initial magnetization curve of the $Sm_2Co_{17}$ type magnet with a high Fe concentration can be made small. The permanent magnet of this embodiment may contain a crystal phase and an amorphous phase other than the 2-17 type crystal phase and the Cu rich phase. As the other phases, M rich phase higher in element M concentration than the intragranular phase and compound phases mainly constituted of element R and Fe are conceivable, but the amount thereof is preferred to be of the degree of impurity phases except the M rich phases. Preferably, the permanent magnet is substantially made up of the 2-17 type crystal phase and the Cu rich phase.

FIG. 1 is a graph illustrating an example of the magnetization curve of a magnet (example) in which the average interval d of the Cu rich phases is less than or equal to 120 nm, in comparison with the magnetization curve of a magnet (comparative example) in which the average interval d of the Cu rich phases is more than 120 nm. As illustrated in FIG. 1, the magnet (example) in which the average interval d of the Cu rich phases is less than or equal to 120 nm is suppressed in rising of the magnetization curve as compared to the magnet (comparative example) in which the average interval d of the Cu rich phases is more than 120 nm. The rising behavior of the magnetization curve of the permanent magnet is evaluated by the pinning rate defined by following expression (2).

Pinning rate (%)=$H(0.02)/Hcj \times 100$ (2)

In expression (2), H(0.02) is the magnetic field where the magnetization curve starts to rise, and is defined as a magnetic field where magnetization of 0.02% of saturation magnetization (Ms) is exhibited. The saturation magnetization is the largest magnetization obtained when a magnetic field of 1200 kA/m is applied. Hcj is coercive force, and is a magnetic field when magnetization is zero in the magnetization curve obtained by applying the magnetic field of 1200 kA/m. That is, it is a magnetic field when magnetization changes from positive to negative, or from negative to positive. Largeness of the pinning rate of the permanent magnet means that the way of rising of the magnetization curve is gentle. When the permanent magnet is used as a variable magnet, preferably, the pinning rate is 50% or more. With the permanent magnet having the pinning rate of 50% or more, the variable width of the variable magnet can be made large.

Figure 2:
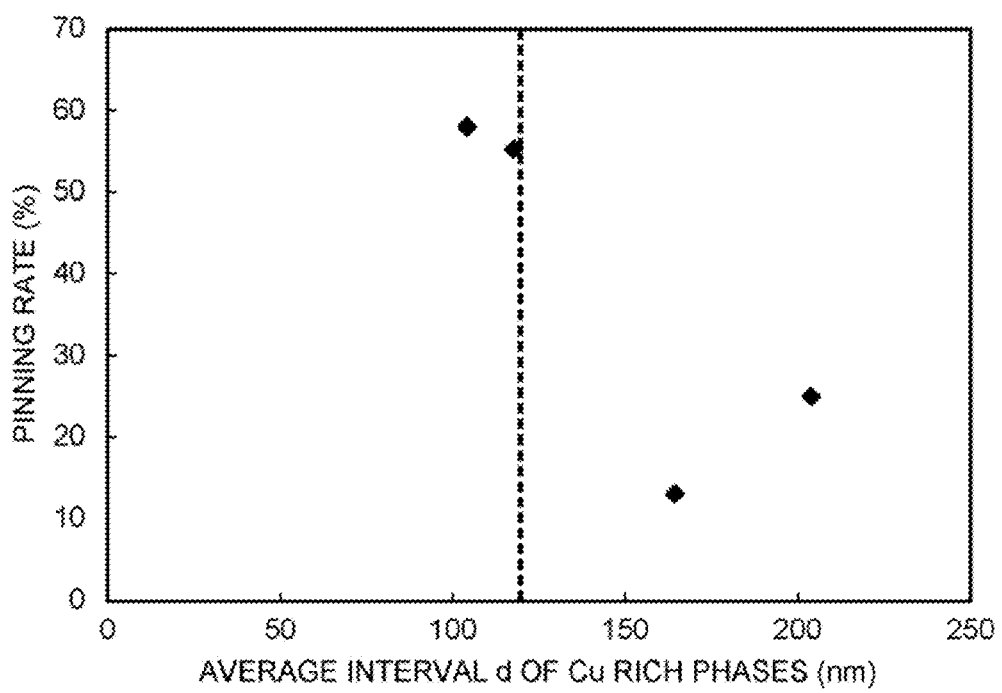
FIG. 2 is a graph illustrating a relation between an average interval of copper rich phases in the permanent magnet and a pinning rate.

FIG. 2 is a graph illustrating a relation between the average interval d of the Cu rich phases and the pinning rate. As illustrated in FIG. 2, by making the average interval d of the Cu rich phases be less than or equal to 120 nm, the pinning rate can be 50% or more. Accordingly, it becomes possible to obtain magnetic characteristics preferred for a variable magnet. When the average interval d of the Cu rich phases is more than 120 nm, movement of magnetic domain wall becomes easy, and the pinning rate decreases. More preferably, the average interval d of the Cu rich phases is less than or equal to 110 nm. The lower limit value of the average interval d of the Cu rich phases is defined by the size of the 2-17 type crystal phases (intragranular phases). Preferably, the average grain diameter of the 2-17 type crystal phases is 20 nm or more. When the average grain diameter of the 2-17 type crystal phases is less than or equal to 20 nm, the magnetization decreases and it is possible that sufficient characteristics as a permanent magnet cannot be obtained.

Moreover, the magnetic characteristics of the $Sm_2Co_{17}$ type magnet are also affected by thicknesses of the Cu rich phases. That is, when the thicknesses of the Cu rich phases are large, the pinning effect of magnetic domain wall becomes too high, and enormous coercive force may be exhibited. When the permanent magnet is applied to a variable magnet, the permanent magnet is preferred to have moderate coercive force. Specifically, the coercive force of the permanent magnet used as a variable magnet is preferred to be in the range of 200 kA/m to 500 kA/m. When the coercive force of the permanent magnet is more than 500 kA/m, it is difficult to be used as a variable magnet, and when the coercive force is less than 200 kA/m, it is not possible to sufficiently increase the performance of the variable magnet.

In such viewpoints, preferably, the average thickness t of the Cu rich phases is less than or equal to 10 nm. By making the average thickness t of the Cu rich phases be less than or equal to 10 nm, a moderate pinning effect of magnetic domain wall can be obtained. Therefore, it is possible to stably provide a permanent magnet having coercive force in the range of 200 kA/m to 500 kA/m, which is preferred for a variable magnet. More preferably, the coercive force of the permanent magnet is in the range of 200 kA/m to 400 kA/m. More preferably, the average thickness t of the Cu rich phases is less than or equal to 8 nm, further more preferably less than or equal to 5 nm. However, when the average thickness t of the Cu rich phases is too small, the pinning effect of the magnetic domain wall is too weak, and it is possible that the coercive force decreases too much. Thus, preferably, the average thickness t of the Cu rich phases is less than or equal to 1 nm.

As described above, the Cu rich phase is an area having the Cu concentration in the range from 1.2 times to 5 times the Cu concentration in the 2-17 type crystal phase (intragranular phase). Therefore, by performing a composition analysis of the cross section including the crystal c axis of the 2-17 type crystal phase with an EDX or the like, the average interval d of the Cu rich phases can be obtained. By observing the cross section including the crystal c axis of the 2-17 type crystal phases under magnification of 100 k times to 200 k times with a transmission electron microscope (TEM), and by performing a composition line analysis of an obtained image to identify the positions of the Cu rich phases, the average interval d of the Cu rich phases is defined as the average value of distances from one Cu rich phase to the next Cu rich phase. The composition line analysis is performed first at intervals of 30 nm to 50 nm in a certain direction, and then performed at similar intervals in an orthogonal direction within the same plane. The average interval d is a value obtained by averaging distances between the Cu rich phases obtained in all the composition line analyses.

A specific example of how to obtain the average interval d of the Cu rich phases will be described below.

(1) Cross Section Observation Step

Figure 3:
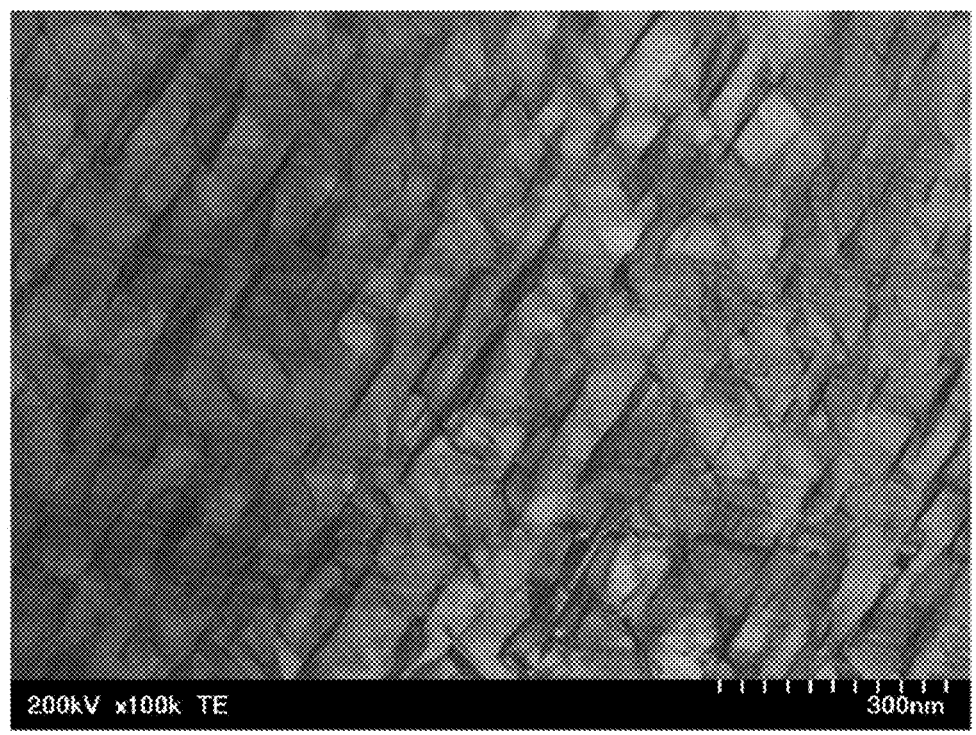
FIG. 3 is a TEM image illustrating in enlargement a structure of the permanent magnet according to the embodiment.

First, the cross section including the c axis of the 2-17 type crystal phases of the permanent magnet (the sintered body with an oriented magnetic field after aging treatment) is observed with the TEM. The observation magnification is 100 k to 200 k times. FIG. 3 illustrates an example of a TEM image (100 k times) which is a cross section observation result of the permanent magnet of the embodiment. In FIG. 3, portions having an even contrast are the 2-17 type crystal phases (intragranular phases), and plate-shaped portions existing among them (dark areas) are the Cu rich phases.

(2) Composition Line Analysis Step

Figure 4:
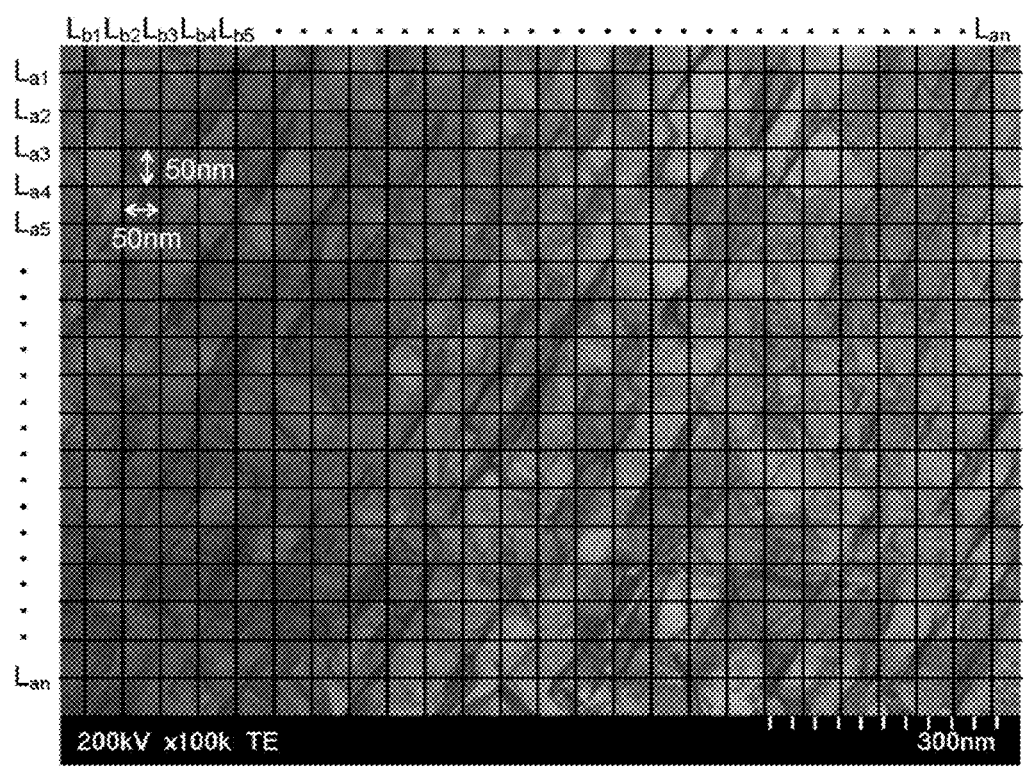
FIG. 4 is an image illustrating a state of a line analysis of copper concentration for measuring an average interval of the copper rich phases from the TEM image illustrated in FIG. 3.

Next, the composition line analysis of the TEM image (FIG. 3) which is the cross section observation result of the permanent magnet is performed. FIG. 4 illustrates an appearance of the composition line analysis of the TEM image of FIG. 3. First, line analyses (La1 to Lan) are performed at equal intervals in a first direction of the TEM image. The line analyses are performed in parallel at equal intervals. The intervals of the line analyses are 30 nm to 50 nm. Next, in the same TEM image, line analyses (Lb1 to Lbn) are performed at equal intervals in a second direction orthogonal to the first direction. The line analyses of this time are also performed in parallel at equal intervals of 30 nm to 50 nm. In FIG. 4, the intervals of the line analyses (parallel lines) are 50 nm.

(3) Position Identification Step of the Cu Rich Phases

Figure 6:
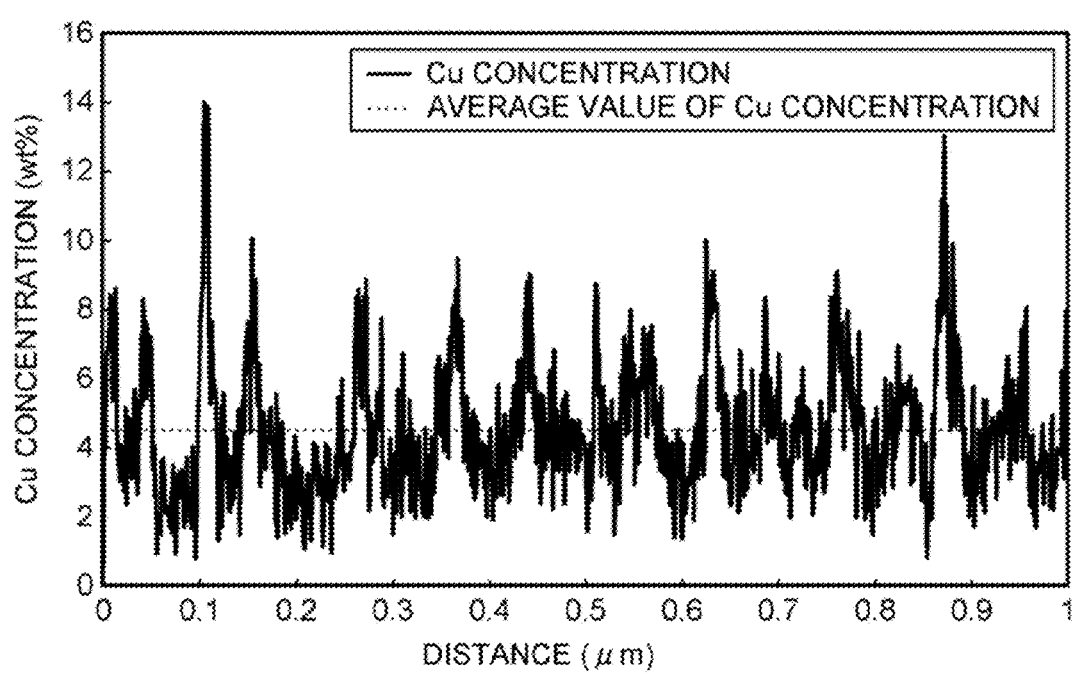
FIG. 6 is a graph illustrating an example of a line analysis result of the copper concentration illustrated in FIG. 4.
Figure 7:
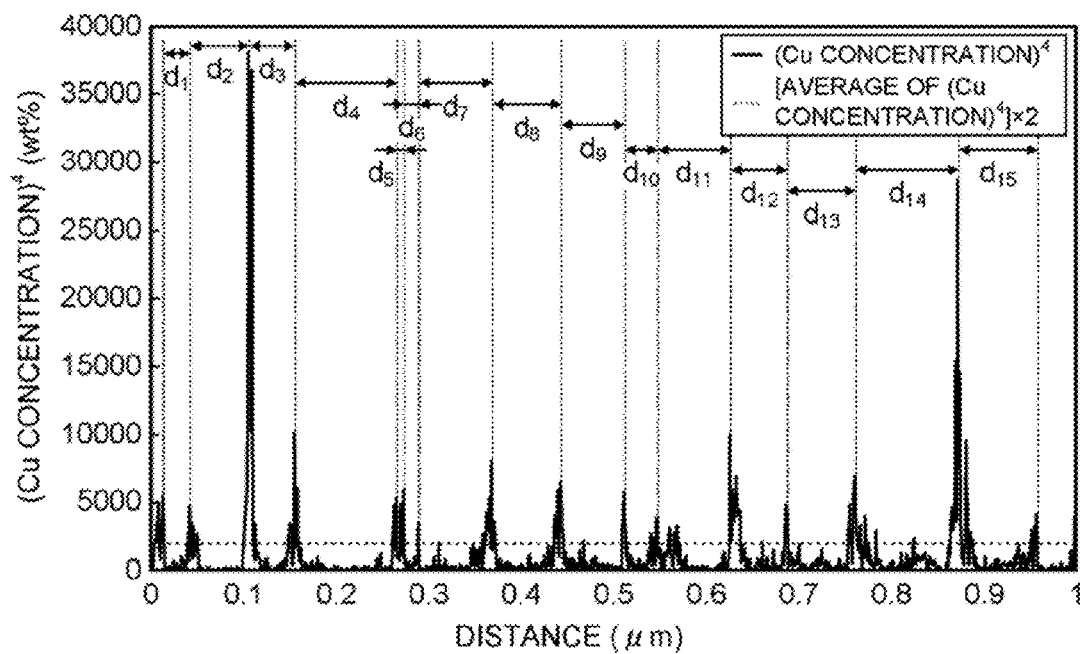
FIG. 7 is a graph in which a concentration difference in the line analysis results of the copper concentration illustrated in FIG. 6 is emphasized.

Next, Cu concentrations are obtained from the respective line analysis results (La1 to Lan and Lb1 to Lbn) of the TEM image. FIG. 6 illustrates observation results of Cu concentrations by the line analysis La4. Further, to clarify the difference in Cu concentration, the second power to the 16th power of the Cu concentrations obtained in the line analyses are calculated, and these values are expressed in graphs to obtain averages. FIG. 7 illustrates a graph plotting data of Cu concentration of FIG. 6 raised to the fourth power. In the diagram, a solid line represents data values (the fourth-powers) of Cu concentration at respective points, and a dotted line is a value obtained by doubling the average value thereof. In FIG. 7, it is assumed as a Cu rich phase an area in which the width of a portion having data values of Cu concentration (the fourth-powers of Cu concentration) which are sequentially larger than the doubled value of the average value is 2 nm or more, and a position in this area where there is a largest data value of Cu concentration is assumed as the center position of the Cu rich phase.

(4) Measuring Step for the Average Interval of Cu Rich Phases

The distances between the center positions of Cu rich phases identified in step 3 (distances between peaks where there is a largest value of Cu concentration/d1, d2, . . . dn of FIG. 7) are considered as a distance between Cu rich phases and measured. The distance da1 between the Cu rich phases in one composition line analysis is obtained as an average value of respective inter-peak distances d1, d2, . . . dn. Such measurement of inter-phase distance is performed on all the line analysis results, so as to obtain an average value of inter-phase distances (da1 to dan and db1 to dbn) of respective line analysis results. The average value [(da1+da2 . . . +dan+db1+db2 . . . +dbn)/2n] of these inter-phase distances is defined as the average distance (average interval of the Cu rich phases) d between the Cu rich phases.

Figure 5:
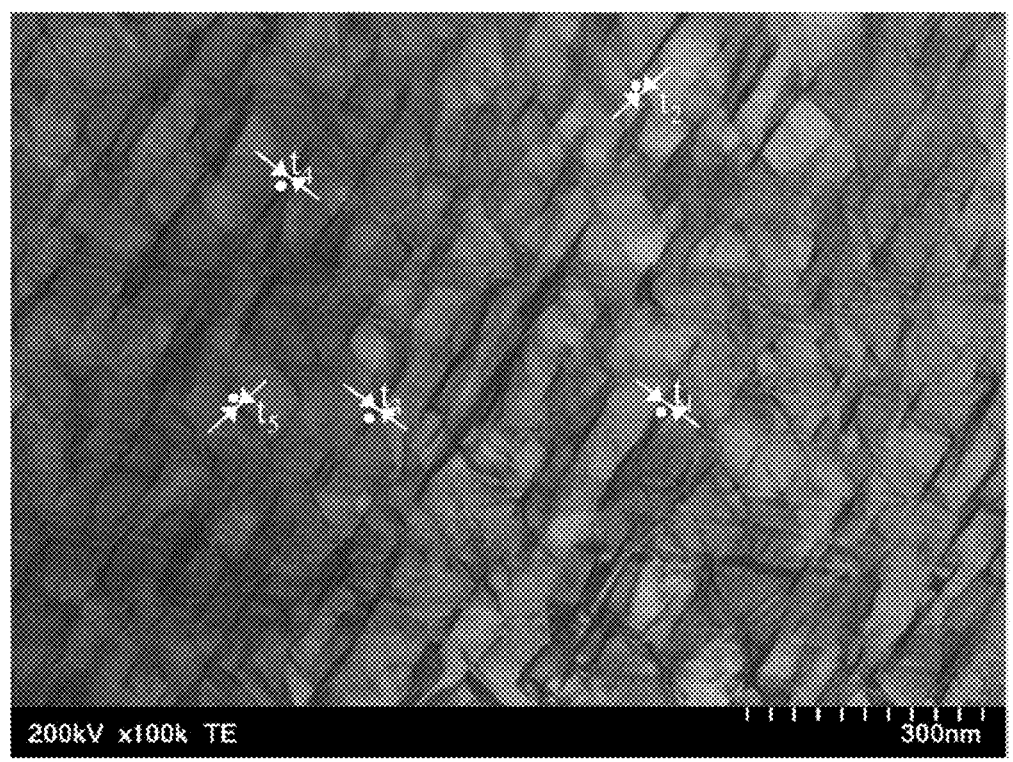
FIG. 5 is an image illustrating a state for measuring an average thickness of the copper rich phases from the TEM image illustrated in FIG. 3.

The thickness of a Cu rich phase is the width of an area having a different contrast between a crystal grain having an even contrast (2-17 type crystal phase) and an adjacent crystal grain having an even contrast (2-17 type crystal phase) in the TEM image of the cross section including the crystal c axis of the 2-17 type crystal phases. The average thickness t of the Cu rich phases indicates the average value of widths of areas having a different contrast which are measured at five points in the TEM image (TEM image illustrated in FIG. 3) under magnification of 100 k times to 200 k times. Specifically, as illustrated in FIG. 5, a portion where an arbitrary plate-shaped, rod-shaped, or streak-shaped contrast can be recognized is chosen. The length (thickness) in a minor-axis direction on the observation image of this portion having a different contrast is measured, and the length is assumed as a thickness t1 of the Cu rich phase. This measurement is performed five times, and the average value of thicknesses t1 to t5 of the Cu rich phases is assumed as the average thickness t of the Cu rich phases.

Figure 8:
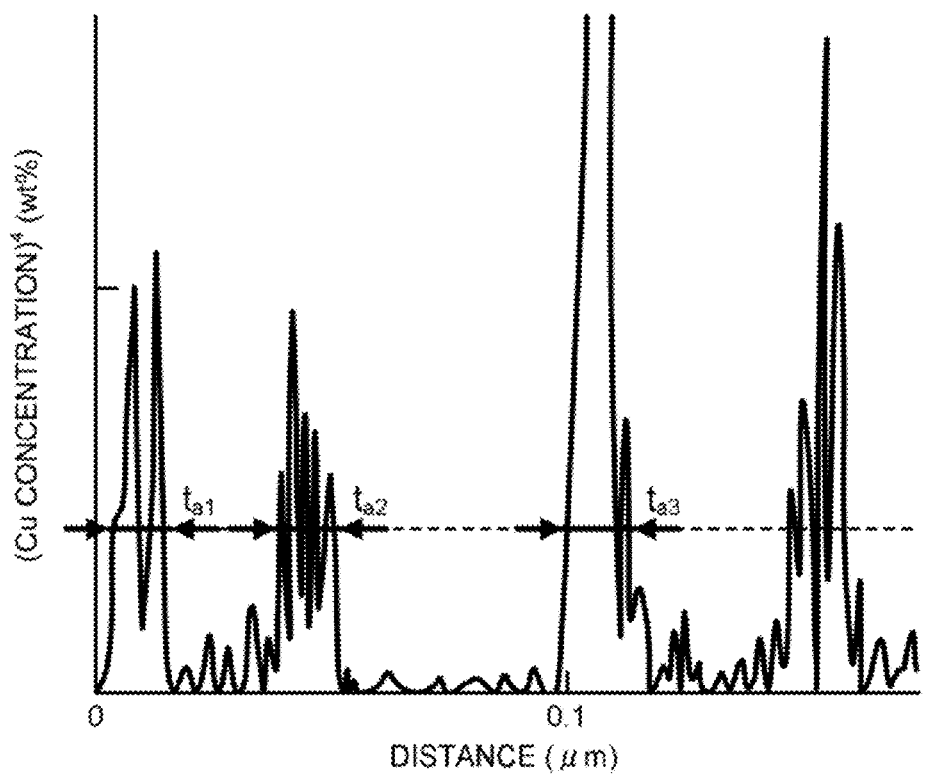
FIG. 8 is a graph illustrating part of FIG. 7 in enlargement.

When a clear Cu rich phase cannot be recognized in the observation image, as described in above-described step 3 of obtaining the average interval d of the Cu rich phases, it is assumed as a Cu rich phase an area in which the width of a portion having data values of Cu concentration (the fourth-powers of Cu concentration) in FIG. 7 which are sequentially larger than the doubled value of the average value is 2 nm or more, and the width of this area is measured to obtain the average value t of the Cu rich phase. FIG. 8 is a view illustrating part of FIG. 7 in enlargement. As illustrated in FIG. 8, thicknesses t1 to t5 of the Cu rich phases may be obtained at five positions of the data values of Cu concentration (the fourth-powers of Cu concentration), and the average value thereof may be assumed as the average thickness t of the Cu rich phases.

With the permanent magnet of this embodiment, in the $Sm_2Co_{17}$ type magnet (permanent magnet having a two-phase structure made up of 2-17 type crystal phases and Cu rich phases) in which the Fe concentration is increased to improve magnetic flux density and to reduce costs, rapid rising of initial magnetization curve can be suppressed since movement of magnetic domain wall is controlled by narrowing the average interval d of the Cu rich phases. Moreover, by controlling the average thickness t of the Cu rich phases, moderate coercive force can also be obtained. Therefore, a permanent magnet preferred for a variable magnet, that is, a permanent magnet having moderate coercive force and a favorable pinning rate (characteristics based on the initial magnetization curve which rises gently) can be provided.

The permanent magnet of this embodiment is produced as follows for example. First, an alloy powder containing a predetermined amount of elements is prepared. The alloy powder is prepared such that, for example, flaky alloy thin bands are prepared by a strip cast method and thereafter pulverized. In the strip cast method, preferably, alloy molten metal is poured by tilting into a cooling roll rotating at circumferential speed of 0.1 m/sec to 20 m/sec, to thereby obtain a thin band which is solidified sequentially with a thickness of 1 mm or smaller. When the circumferential speed of the cooling roll is less than 0.1 m/sec, dispersion in composition occurs easily in the thin band. When the circumferential speed is more than 20 m/sec, the crystal grains are miniaturized to be a single magnetic domain size or smaller, and favorable magnetic characteristics cannot be obtained. More preferably, the circumferential speed of the cooling roll is in the range of 0.3 m/sec to 15 m/sec, further more preferably in the range of 0.5 m/sec to 12 m/sec.

The alloy powder may be prepared by pulverizing an alloy ingot, which is obtained by casting molten metal by an arc melting method or a high-frequency melting method. As other preparation methods for the alloy powder, there are mechanical alloying method, mechanical grinding method, gas atomizing method, reduction diffusion method, and so on, and an alloy powder prepared by these methods may be used. A heat treatment may be performed as necessary on the alloy powder or the alloy before pulverization obtained in this manner, so as to homogenize the powder. Pulverization of flakes or an ingot is performed by using a jet mill, ball mill, or the like. In order to prevent oxidation of the alloy powder, preferably, the pulverization is performed in an inert-gas atmosphere or organic solvent.

Next, an alloy powder is filled in a metal mold placed in an electromagnet or the like, and the powder is press-formed while applying a magnetic field, thereby preparing a green compact in which crystal axes are oriented. This green compact is sintered for 0.5 to 15 hours at temperatures between 1100° C. and 1300° C., thereby obtaining a sintered body. When the sintering temperature is lower than 1100° C., the density of the sintered body becomes insufficient, and when the sintering temperature is higher than 1300° C., rare earth elements such as Sm evaporate, and favorable magnetic characteristics cannot be obtained. More preferably, the sintering temperature is in the range of 1150° C. to 1250° C., further more preferably in the range of 1180° C. to 1230° C.

Further, when the sintering time is less than 0.5 hour, it is possible that the density of the sintered body become uneven. On the other hand, when the sintering time is more than 15 hours, rare earth elements such as Sm evaporate, and favorable magnetic characteristics cannot be obtained. More preferably, the sintering time is in the range of 1 to 10 hours, further more preferably in the range of 1 to 4 hours. In order to prevent oxidation, preferably, sintering of the green compact is performed in a vacuum or an inert gas atmosphere of argon gas or the like.

A solution treatment and an aging treatment are performed on the obtained sintered body to control the crystal structure. In the solution treatment, preferably, heat treatment is performed for 0.5 to 8 hours at temperatures in the range of 1130° C. to 1230° C., so as to obtain 1-7 type crystal phase as a precursor for the phase separation structure. At temperatures lower than 1130° C. and higher than 1230° C., the ratio of the 1-7 type crystal phase in a sample after solution treatment is small, and favorable magnetic characteristics cannot be obtained. More preferably, the solution treatment temperature is in the range of 1150° C. to 1210° C., further more preferably in the range of 1160° C. to 1190° C.

When the solution treatment time is less than 0.5 hour, structure phase easily becomes uneven. Further, when the solution treatment is performed more than 8 hours, evaporation of rare earth elements such as Sm in the sintered body occurs, and it is possible that favorable magnetic characteristics are not obtained. More preferably, the solution treatment time is in the range of 1 to 8 hours, further more preferably in the range of 1 to 4 hours. In order to prevent oxidation, preferably, the solution treatment is performed in a vacuum or an inert gas atmosphere of argon gas.

Next, an aging treatment is performed on the sintered body after solution treatment. Aging treatment conditions are important for controlling the average interval d and the average thickness t of the Cu rich phases. Further, optimum aging treatment conditions also vary depending on an alloy composition. That is, the precipitation behavior of Cu rich phases varies due to the composition ratio of elements constituting the permanent magnet. Accordingly, regarding the aging treatment temperature of the sintered body, it is necessary to choose temperatures which allow minute Cu rich phases to be distributed finely in the structure, according to the alloy structure. In this embodiment, the aging treatment is performed at a temperature T satisfying the following expression (3) and expression (4).

$$TB-50<T<TB+50 \quad (3)$$

$$TB=3500p-5000q-(45p)^2 \quad (4)$$

In the expression (4), p represents a value indicating the concentration of Fe in the composition formula of the expression (1), and q represents a value indicating the F element M in the composition formula of equation (1).

By performing the aging treatment at the temperature T satisfying the expression (3) and the expression (4), the average interval d of the Cu rich phases can be controlled to be less than or equal to 120 nm. The average thickness t of the Cu rich phases can also be less than or equal to 10 nm by performing the aging treatment on the sintered body at the temperature T. When the aging treatment temperature exceeds [TB+50(° C.)], coarse Cu rich phases are generated easily, and the average interval of the Cu rich phases becomes large. On the other hand, when the aging treatment temperature is less than [TB−50(° C.)], generation of cores of the Cu rich phases cannot occur sufficiently.

Preferably, the aging treatment time is in the range of 0.25 to 8 hours. When the aging treatment time is less than 0.25 hour, it is possible that generation of cores of the Cu rich phases cannot occur sufficiently. When the aging treatment time is exceeded, the Cu rich phases become coarse and large, and thereby fine generation of Cu rich phases is hindered. More preferably, the aging treatment time is in the range of 0.5 to 6 hours, further more preferably in the range of 1 to 4 hours.

Thus, by performing the aging treatment on the sintered body after the solution treatment at the temperature T which is set based on the alloy composition, it is possible to finely distribute minute Cu rich phases in the structure. The aging treatment of the sintered body may only be a heat treatment at a temperature T, but for further improving the coercive force or the like, it is preferred that the heat treatment at the temperature T be a first aging process, and a second aging process be performed thereafter at a temperature higher than the temperature T. Preferably, the aging treatment process includes the first heat treating the sintered body at a temperature T1 satisfying the temperature T, and the second heat treating the sintered body at a temperature T2 higher than the temperature T1.

After the Cu rich phases are finely distributed and precipitated in the first aging process at the temperature T1 (=T), by performing the second aging process at the temperature T2 higher than the temperature T, the magnetic characteristics can be increased while maintaining the precipitation state of the fine Cu rich phases. Preferably, the second aging temperature T2 is in the range of 680° C. to 900° C. When the second aging temperature T2 is lower than 680° C., homogeneous mixed phases of 2-17 type crystal phases and Cu rich phases cannot be obtained easily, and the magnetic characteristics cannot be increased. When the second aging temperature T2 exceeds 900° C., the Cu rich phases become coarse and large and the coercive force becomes enormous, or it may cause decrease in magnetization. Preferably, the second aging temperature T2 is in the range of 700° C. to 890° C., more preferably in the range of 700° C. to 880° C.

Preferably, the second aging treatment time is in the range of 0.5 to 24 hours. When the second aging treatment time is less than 0.5 hour, the amount of generated Cu rich phases may become insufficient. When the second aging treatment time exceeds 24 hours, the coercive force becomes enormous due to that the thicknesses of the Cu rich phases become thick, and it is possible that magnetic characteristics suitable for a variable magnet cannot be obtained. More preferably, the second aging treatment time is in the range of 1 to 12 hours, further more preferably in the range of 2 to 4 hours. The second aging process may be performed after the sintered body is cooled to room temperature after the first aging process, or may be performed subsequently to the first aging process.

When cooling speed after the aging treatment is less than 0.2° C./min, the coercive force becomes enormous due to that the thickness of the Cu rich phases become large, or crystal grains become coarse and large and favorable magnetic characteristics cannot be obtained. When the cooling rate exceeds 2° C./min, element diffusion does not proceed sufficiently, and the Cu concentration difference between the 2-17 type crystal phases and the Cu rich phases may become insufficient. More preferably, the cooling speed after the aging treatment is in the range of 0.4° C./min to 1.5° C./min, further more preferably in the range of 0.5° C./min to 1.3° C./min. In order to prevent oxidation, preferably, the aging treatment is performed in a vacuum or an inert gas atmosphere of argon gas or the like.

The permanent magnet of this embodiment is preferred as a variable magnet. By using the permanent magnet of this embodiment as a variable magnet, a variable magnetic flux motor or a variable magnetic flux generator is structured. For the structure and drive system of the variable magnetic flux motor, technologies disclosed in prior related arts can be applied. By using the permanent magnet of this embodiment as a variable magnet in a variable magnetic flux drive system, it is possible to achieve increase in efficiency, size reduction, cost reduction, and the like of the system.

Figure 9:
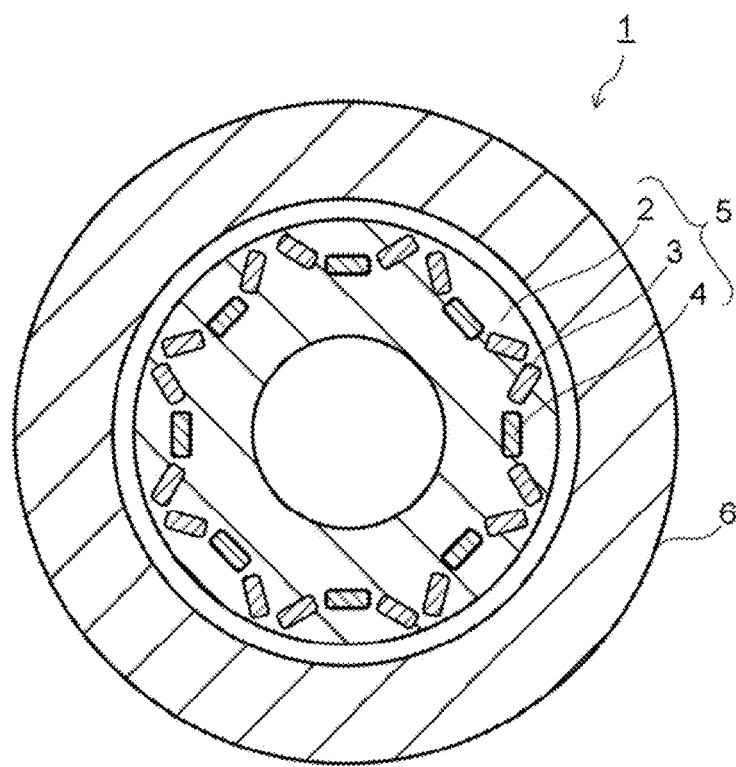
FIG. 9 is a diagram illustrating a variable magnetic flux motor according to the embodiment.
Figure 10:
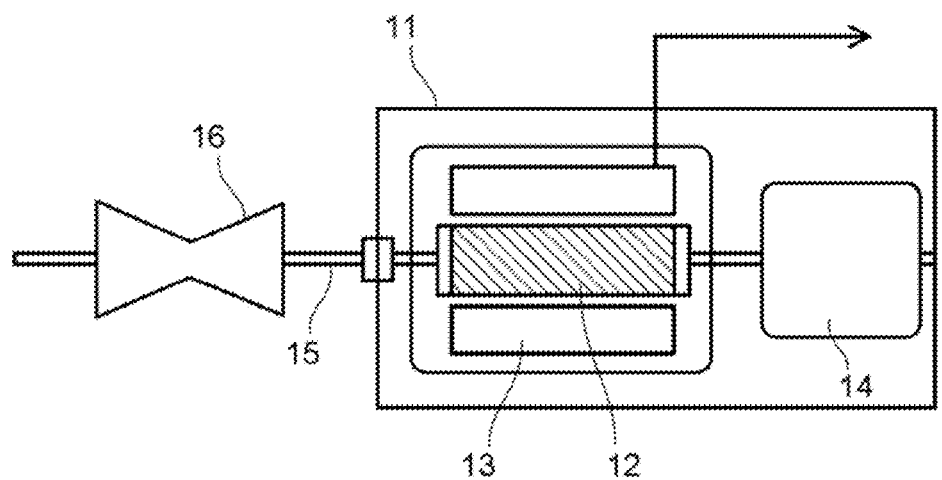
FIG. 10 is a diagram illustrating a variable magnetic flux generator according to the embodiment.

As illustrated in FIG. 9, a variable magnetic flux motor 1 includes a rotor 5 in which a stationary magnet 3 and a variable magnet 4 are disposed in an iron core 2, and a stator 6 having a structure similar to conventional motors. As illustrated in FIG. 10, a variable magnetic flux generator 11 includes a rotor 12 having a stationary magnet and a variable magnet, a stator 13, and a brush 14. The variable magnetic flux generator 11 operates to generate power by rotating a shaft 15 attached to the rotor 12 with a turbine 16. Note that it is not intended to inhibit application of the permanent magnet of this embodiment to a permanent magnet motor or the like.

EXAMPLES

Next, specific examples of the present invention and evaluation results thereof will be described.

Example 1

Respective materials were weighed to make a composition $(Sm_{0.85}Nd_{0.15})(Fe_{0.28}Zr_{0.025}Cu_{0.05}Cu_{0.47})_{7.8}$, and thereafter arc melted in an Ar gas atmosphere to prepare an alloy ingot. After the alloy ingot was heat treated in an Ar atmosphere under conditions 1170° C. for 1 hour, it is roughly pulverized, and finely pulverized with a jet mill to prepare an alloy powder. This alloy powder was pressed in a magnetic field to make a green compact, which was thereafter sintered at 1190° C. for 3 hours in an Ar atmosphere, and subsequently heat treated at 1170° C. for 3 hours to prepare a sintered body. This heat treatment was performed for the solution treatment.

Then, as the first aging treatment, a heat treatment under conditions of 730° C. for 1.5 hours was performed on the sintered body after the solution treatment, and thereafter it was slowly cooled to room temperature at cooling speed of 2° C./min. Subsequently, as the second aging treatment, a heat treatment was performed on the sintered body after the first aging treatment under conditions of 830° C. for 4 hours, and thereafter it was slowly cooled to 600° C. at cooling speed of 1.2° C./min, thereby obtaining a target sintered magnet. The temperature TB based on the alloy composition (p=0.28, q=0.025) is approximately 696° C. Therefore, the first aging treatment temperature T1 (730° C.) satisfies the range [TB−50 (646° C.)<T<TB+50 (746° C.)]. The composition of the magnet was confirmed by an ICP method. The sintered magnet obtained in this manner was subjected to characteristic evaluation which will be described later.

Examples 2 to 4

Besides using alloy powders whose compositions are illustrated in Table 1, sintered magnets were each prepared similarly to Example 1. The first and second aging treatment conditions were the same as those of Example 1. The temperatures TB (° C.), [TB−50(° C.)], [TB+50(° C.)] based on respective alloy compositions are as illustrated in Table 2. The sintered magnets obtained in this manner were subjected to characteristic evaluation which will be described later.

Comparative Example 1

Using an alloy powder having the same composition as Example 1, a sintered body was prepared under the same conditions as those of Example 1. As the first aging treatment, a heat treatment was performed on this sintered body under conditions of 820° C. for 1.5 hours, and thereafter it was slowly cooled to room temperature at cooling speed of 2° C./min. Subsequently, as the second aging treatment, a heat treatment was performed on the sintered body after the first aging treatment under conditions of 830° C. for 4 hours, and thereafter it was slowly cooled to 600° C. at cooling speed of 1.2° C./min. The temperature TB based on the alloy composition is approximately 696° C. similarly to Example 1, and thus the first aging treatment temperature T1 (820° C.) is out of the range [TB−50 (646° C.)<T<TB+50 (746° C.)].

Example 5

Respective materials were weighed to make a composition $(Sm_{0.9}Nd_{0.1})(Fe_{0.34}Zr_{0.03}Cu_{0.05}Cu_{0.58})_{7.5}$, and thereafter arc melted in an Ar gas atmosphere to prepare an alloy ingot. This alloy ingot was charged in a nozzle made of quartz and melted by high-frequency induction heating, and thereafter the molten metal was poured by tilting into a cooling roll rotating at circumferential speed of 0.6 m/sec and was sequentially solidified to prepare a thin band. This thin band was roughly pulverized and then finely pulverized with a jet mill, thereby preparing an alloy powder. This alloy powder was pressed in a magnetic field to make a green compact, which was thereafter sintered at 1200° C. for 1 hour in an Ar atmosphere, and subsequently heat treated at 1180° C. for 4 hours to prepare a sintered body.

Then, as the first aging treatment, a heat treatment under conditions of 850° C. for 1.5 hours was performed on the sintered body after the solution treatment. Subsequently, as the second aging treatment, a heat treatment was performed under conditions of 875° C. for 4 hours, and thereafter it was slowly cooled to 450° C. at cooling speed of 1.3° C./min, thereby obtaining a target sintered magnet. Here, the temperature TB based on the alloy composition (p=0.34, q=0.03) is approximately 806° C. Therefore, the first aging treatment temperature T1 (850° C.) satisfies the range [TB−50 (756° C.)<T<TB+50 (856° C.)]. The composition of the magnet was confirmed by an ICP method. The sintered magnet obtained in this manner was subjected to characteristic evaluation which will be described later.

Examples 6 and 7

Besides using alloy powders whose compositions are illustrated in Table 1, sintered magnets were each prepared similarly to Example 5. The first and second aging treatment conditions were the same as those of Example 5. Here, the temperatures TB (° C.), [TB−50 (° C.)], [TB+50(° C.)] based on respective alloy compositions are as illustrated in Table 2. The sintered magnets obtained in this manner were subjected to characteristic evaluation which will be described later.

Comparative Example 2

Using an alloy powder having the same composition as Example 5, a sintered body was prepared under the same conditions as those of Example 5. As the first aging treatment, a heat treatment was performed on this sintered body under conditions of 870° C. for 1.5 hours. Subsequently, as the second aging treatment, a heat treatment was performed under conditions of 875° C. for 4 hours, and thereafter it was slowly cooled to 450° C. at cooling speed of 1.3° C./min. Here, the temperature TB based on the alloy composition is approximately 806° C. similarly to Example 5, and thus the first aging treatment temperature T1 (870° C.) is out of the range [TB−50 (756° C.)<T<TB+50 (856° C.)].

Examples 8 to 10

Besides using alloy powders whose compositions are illustrated in Table 5, sintered magnets were prepared under the same conditions as those of Example 1. Temperature conditions of the first and second aging treatments were the same as those of Example 1. Here, the temperatures TB (° C.), [TB−50(° C.)], [TB+50 (° C.)] based on respective alloy compositions are as illustrated in Table 2. The sintered magnets obtained in this manner were subjected to characteristic evaluation which will be described later.

TABLE 1

| | Magnet composition (atomic ratio) |
|---|---|
| Example 1 | $(Sm_{0.85}Nd_{0.15})(Fe_{0.28}Zr_{0.025}Cu_{0.05}Co_{0.47})_{7.8}$ |
| Example 2 | $Sm(Fe_{0.31}(Ti_{0.1}Zr_{0.9})_{0.04}Cu_{0.06}Co_{0.59})_{8.2}$ |
| Example 3 | $(Sm_{0.95}Pr_{0.05})(Fe_{0.3}Zr_{0.03}Cu_{0.07}Co_{0.60})_{8.1}$ |
| Example 4 | $Sm(Fe_{0.32}Zr_{0.035}Cu_{0.06}Co_{0.585})_{7.9}$ |
| Example 5 | $(Sm_{0.9}Nd_{0.1})(Fe_{0.34}Zr_{0.03}Cu_{0.05}Co_{0.58})_{7.5}$ |
| Example 6 | $Sm(Fe_{0.38}(Ti_{0.2}Zr_{0.8})_{0.035}Cu_{0.06}Co_{0.525})_{7.7}$ |
| Example 7 | $Sm(Fe_{0.4}(Ti_{0.1}Zr_{0.9})_{0.037}Cu_{0.055}Co_{0.508})_{7.6}$ |
| Example 8 | $(Sm_{0.8}Nd_{0.2})(Fe_{0.32}Zr_{0.028}Cu_{0.055}Mn_{0.02}Co_{0.577})_{8.2}$ |
| Example 9 | $Sm(Fe_{0.30}Zr_{0.03}Cu_{0.05}Co_{0.605}Ga_{0.015})_{7.9}$ |
| Example 10 | $(Sm_{0.75}Pr_{0.25})(Fe_{0.29}Zr_{0.028}Si_{0.02}Cu_{0.06}Co_{0.602})_{8.35}$ |
| Comparative Example 1 | $(Sm_{0.85}Nd_{0.15})(Fe_{0.28}Zr_{0.025}Cu_{0.05}Co_{0.47})_{7.8}$ |
| Comparative Example 2 | $(Sm_{0.9}Nd_{0.1})(Fe_{0.34}Zr_{0.03}Cu_{0.05}Co_{0.58})_{7.5}$ |

TABLE 2

| | | | | Aging treatment condition | | | |
|---|---|---|---|---|---|---|---|
| | | | | First aging treatment | | Second aging treatment | |
| | TB (° C.) | TB − 50 (° C.) | TB + 50 (° C.) | Temperature T1 (° C.) | Time (h) | Temperature T2 (° C.) | Time (h) |
| Example 1 | 696 | 646 | 746 | 730 | 1.5 | 830 | 4 |
| Example 2 | 690 | 640 | 740 | 730 | 1.5 | 830 | 4 |
| Example 3 | 718 | 668 | 768 | 730 | 1.5 | 830 | 4 |
| Example 4 | 738 | 688 | 788 | 730 | 1.5 | 830 | 4 |
| Example 5 | 806 | 756 | 856 | 850 | 1.5 | 875 | 4 |
| Example 6 | 863 | 813 | 913 | 850 | 1.5 | 875 | 4 |
| Example 7 | 891 | 841 | 941 | 850 | 1.5 | 875 | 4 |
| Example 8 | 773 | 723 | 823 | 730 | 0.5 | 830 | 12 |
| Example 9 | 718 | 668 | 768 | 730 | 0.5 | 830 | 12 |
| Example 10 | 705 | 775 | 655 | 730 | 0.5 | 830 | 12 |
| Comparative Example 1 | 696 | 646 | 746 | 820 | 1.5 | 830 | 4 |
| Comparative Example 2 | 806 | 756 | 856 | 870 | 1.5 | 875 | 4 |

Regarding the sintered magnets of above-described Examples 1 to 10 and Comparative Examples 1 to 3, a cross section including a crystal c axis of 2-17 type crystal phase was observed with a TEM. As a result, it was confirmed that all of them have a two-phase structure made up of 2-17 type crystal phases (intragranular phases) and Cu rich phases (grain boundary phases) The Cu concentrations in the intragranular phases and the grain boundary phases were measured, and it was confirmed that all the ratios of Cu concentration in the grain boundary phases to the Cu concentration in the intragranular phases are more than or equal to 1.2 times and less than or equal to 5 times. Then, a composition line analysis of the TEM image was performed based on the above-described method, and the average interval d of the Cu rich phases was obtained from line analysis results. The TEM image was magnified 200 k times, and intervals of line analyses were 50 nm. Further, the average thickness t of the Cu rich phases was obtained based on the above-described method from the TEM image. Results of them are illustrated in Table 3.

Next, the magnetic characteristics of the respective sintered magnets were evaluated with a BH tracer, and a residual magnetization Mr and a coercive force Hcj were measured. Further, a magnetic field H (0.02) where magnetization of 0.02% of the saturation magnetization Ms is exhibited was obtained from a magnetization curve obtained with the BH tracer, and the pinning rate was calculated based on the above-described expression (2) Results of them are illustrated in Table 3.

TABLE 3

| | Average interval d of Cu rich phases [nm] | Average thickness t of Cu rich phases [nm] | Magnetic characteristics | | |
|---|---|---|---|---|---|
| | | | Coercive force Hcj [kA/m] | Residual magnetization Mr [T] | Pinning rate [%] |
| Example 1 | 90 | 10 | 380 | 1.18 | 60 |
| Example 2 | 110 | 8 | 370 | 1.19 | 51 |
| Example 3 | 110 | 8 | 370 | 1.18 | 55 |
| Example 4 | 115 | 7 | 340 | 1.20 | 52 |
| Example 5 | 80 | 6 | 350 | 1.20 | 60 |
| Example 6 | 110 | 4 | 215 | 1.21 | 52 |
| Example 7 | 115 | 2 | 205 | 1.22 | 50 |
| Example 8 | 115 | 5 | 300 | 1.19 | 51 |
| Example 9 | 100 | 9 | 370 | 1.16 | 57 |
| Example 10 | 105 | 8 | 350 | 1.17 | 53 |
| Comparative Example 1 | 130 | 22 | 540 | 1.16 | 35 |
| Comparative Example 2 | 180 | 15 | 510 | 1.19 | 30 |

As is clear from Table 3, the average intervals d of the Cu rich phases in the sintered magnets of Examples 1 to 10 are all less than or equal to 120 nm, and the average thicknesses t of the Cu rich phases were less than or equal to 10 nm. As a result, it was confirmed that the sintered magnet of Examples have a coercive force of 200 kA/m to 400 kA/m and a pinning rate of 50% or more, having favorable magnet characteristics for a variable magnet. On the other hand, in the permanent magnets of Comparative Examples 1 and 2, the average interval d of the Cu rich phases is more than 120 nm, and the average thickness of the Cu rich phases is more than 10 nm. Thus, in the permanent magnets of Comparative Examples 1 and 2, the pinning rate is low and rising of magnetization curve is not suppressed. It was confirmed that in the permanent magnets of Comparative Examples 1 and 2, magnetic characteristics suitable for a variable magnet are not obtained.

The permanent magnet according to the above described embodiments is utilized effectively as a variable magnet. The permanent magnet as a variable magnet is utilized effectively in a variable magnetic flux motor or variable magnetic flux generator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet, comprising:
a composition represented by a composition formula:

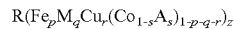

$R(Fe_pM_qCu_r(Co_{1-s}A_s)_{1-p-q-r})_z$ where, R is Sm, or 70 at. % or more of Sm and balance being at least one element selected from the group consisting of Ce, Nd, and Pr,
M is at least one element selected from the group consisting of Ti, Zr, and Hf,
A is at least one element selected from the group consisting of Ni, V, Cr, Mn, Al, Si, Ga, Nb, Ta, and W,
p is a number satisfying 0.26≤p≤0.6 (atomic ratio),
q is a number satisfying 0.005≤q≤0.1 (atomic ratio),
r is a number satisfying 0.01≤r≤0.15 (atomic ratio),
s is a number satisfying 0≤s≤0.2 (atomic ratio),
z is a number satisfying 4 z 9 (atomic ratio); and
a structure including $Th_2Zn_{17}$ crystal phases and copper-rich phases each having a copper concentration in a range of from 1.2 times to 5 times a copper concentration in the $Th_2Zn_{17}$ crystal phase,
wherein an average distance between the copper-rich phases in a cross section including a crystal c axis of the $Th_2Zn_{17}$ crystal phases is 120 nm or less.

2. The permanent magnet according to claim 1, wherein an average thickness of the copper-rich phases is 10 nm or less.

3. The permanent magnet according to claim 1, wherein 50 atomic % or more of the element M is zirconium.

4. A variable magnetic flux motor comprising the permanent magnet according to claim 1.

5. A variable magnetic flux generator comprising the permanent magnet according to claim 1.

6. The permanent magnet according to claim 1, wherein the average distance between the copper-rich phases is 20 nm or more and 110 nm or less.

7. The permanent magnet according to claim 1, wherein an average thickness of the copper-rich phases is 1 nm or more and 8 nm or less.

8. The permanent magnet according to claim 1, wherein each of the copper-rich phases includes at least one selected from the group consisting of $CaCu_5$ crystal phase, a $TbCu_7$ crystal phase, and a precursor phase of $CaCu_5$ crystal phase.

9. The permanent magnet according to claim 1, wherein an average grain diameter of the $Th_2Zn_{17}$ crystal phases is 20 nm or more.

10. The permanent magnet according to claim 1, wherein the permanent magnet has a coercive force in a range of from 200 kA/m to 500 kA/m.

11. The permanent magnet according to claim 1, wherein a pinning rate (P) of the permanent magnet defined by a following expression is 50% or more, $P (\%)=H(0.02)/Hcj \times 100$, where the H(0.02) is a magnetic field where a magnetization of 0.02% of a saturation magnetization (Ms) is exhibited, the saturation magnetization (Ms) is a largest magnetization obtained when a magnetic field of 1200 kA/m is applied, and the Hcj is a coercive force defined by a magnetic field when a magnetization is zero in a magnetization curve obtained by applying a magnetic field of 1200 kA/m.

12. A method for manufacturing a permanent magnet, comprising:

fabricating an alloy powder having a composition represented by a composition formula:

$$R(Fe_pM_qCu_r(Co_{1-s}A_s)_{1-p-q-r})_z$$

where, R is Sm, or 70 at. % or more of Sm and balance being at least one element selected from the group consisting of Ce, Nd, and Pr, M is at least one element selected from the group consisting of Ti, Zr, and Hf, A is at least one element selected from the group consisting of Ni, V, Cr, Mn, Al, Si, Ga, Nb, Ta, and W, p is a number satisfying $0.26 \leq p \leq 0.6$ (atomic ratio), q is a number satisfying $0.005 \leq q \leq 0.1$ (atomic ratio), r is a number satisfying $0.01 \leq r \leq 0.15$ (atomic ratio), s is a number satisfying $0 \leq s \leq 0.2$ (atomic ratio), z is a number satisfying $4 \leq z \leq 9$ (atomic ratio);

press-forming the alloy powder in a magnetic field to form a green compact;

sintering the green compact to form a sintered body;

performing a solution treatment on the sintered body; and performing an aging treatment on the sintered body after the solution treatment, wherein the aging treatment comprises first heat-treating the sintered body after the solution treatment at a temperature T1 (° C.), second heat-treating the sintered body after the first heat-treating at a temperature T2 (° C.), and cooling the sintered body after the second heat-treating at a cooling speed of from 0.2 to 2° C./min, wherein the temperature T1 satisfies TB−50<T1<TB+50, where TB (° C.) is a temperature represented by a formula: $3500 p - 5000 q - (45p)^2$, and the temperature T2 satisfies T1+25 (° C.)≤T2, and wherein the sintered body after the aging treatment comprises a structure including $Th_2Zn_{17}$ crystal phases and copper-rich phases each having a copper concentration in a range of from 1.2 times to 5 times a copper concentration in the $Th_2Zn_{17}$ crystal phase, and an average distance between the copper-rich phases in a cross section including a crystal c axis of the $Th_2Zn_{17}$ crystal phases is 120 nm or less.

13. The manufacturing method according to claim 12, wherein the sintered body after the solution treatment is first heat-treated by holding at the temperature T1 for from 0.5 hours to 6 hours.

14. The manufacturing method according to claim 12, wherein the sintered body after the first heat-treating is second heat-treated by holding at the temperature T2 for from 0.5 hours to 24 hours.

15. The manufacturing method according to claim 12, wherein the solution treatment is performed by holding the sintered body at a temperature in a range of from 1130° C. to 1230° C. for from 0.5 hours to 8 hours.

16. The manufacturing method according to claim 12, wherein the sintered body after the aging treatment has a coercive force in a range of from 200 kA/m to 500 kA/m.

* * * * *